J. A. TRAUT.
Plumb-Bobs.

No. 151,521.

Patented June 2, 1874.

Witnesses:

Inventor:
Justus A. Traut.
By Parker H. Sweet Jr. his Atty.
for James Shepard.

AM. PHOTO-LITHOGRAPHIC Co. N.Y. (OSBORNE'S PROCESS.)

UNITED STATES PATENT OFFICE.

JUSTUS A. TRAUT, OF NEW BRITAIN, CONNECTICUT, ASSIGNOR TO THE STANLEY RULE AND LEVEL COMPANY, OF SAME PLACE.

IMPROVEMENT IN PLUMB-BOBS.

Specification forming part of Letters Patent No. 151,521, dated June 2, 1874; application filed April 28, 1874.

*To all whom it may concern:*

Be it known that I, JUSTUS A. TRAUT, of New Britain, in the county of Hartford and State of Connecticut, have invented certain new and useful Improvements in Plumb-Bobs, of which the following is a specification:

In my plumb-bob a frame extends above the body of the plumb, and within which frame there is a friction-spool, the edges of which project at two sides of the frame; and the central upper portion of said frame is provided with a hole, through which a cord passes to the barrel of the spool, all as hereinafter described.

Figure 1:
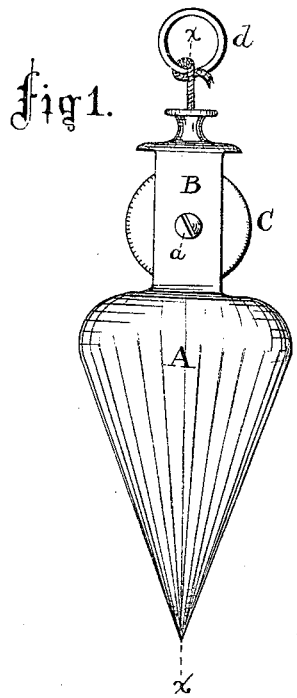
Figure 2:
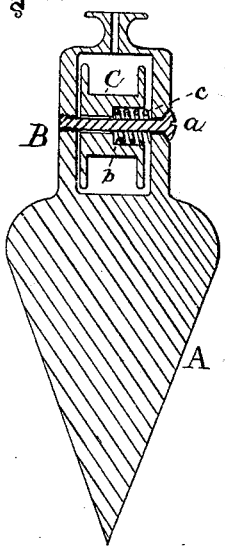

In the accompanying drawing, Figure 1 is a side elevation of a plumb-bob which embodies my invention; and Fig. 2 is a vertical section of the same, on line $x\ x$ of Fig. 1.

Upon the upper end of the plumb proper A there is a frame, B, and inside of said frame is a spool, C. This spool is of a diameter larger than the width of the frame B, so that its edge will project, and allow the operator to roll said spool with his fingers; and for convenience of so doing, the edges of the spool are knurled or roughened in any proper manner. This spool C is secured within the frame B by means of a bolt or screw, $a$, one end of which is threaded, and fits in a correspondingly-threaded hole in one side of the frame. The body of the screw $a$ is straight, and the end opposite the thread is provided with a head of any ordinary construction. One side of the spool C is provided with a recess, $b$, within which and surrounding the screw $a$ is a spiral spring, $c$. (See Fig. 2.) This spring forces the spool C against one side of the frame B. The spool B is wound with a fine cord, which passes through a central hole at the upper part of the frame B, and its end is then secured to a ring, $d$, in order to prevent it from drawing into the hole.

It is designed to have the spring $c$ of such strength that the friction of the spool C will be sufficient to sustain the weight of the device without unwinding the cord; but the tension of said spring may be regulated by turning the screw $a$, the walls of the frame B being purposely made thin enough to give a little, and thereby admit of said adjustment.

In use, the cord-ring $d$ is held by the hand of the operator, and the plumb A hanging pendent therefrom, as in the ordinary manner. If more length of line is desired, a sudden pull on the cord will unwind a portion of it from the spool, whereby the operator is enabled to obtain any desired length of cord by the use of one hand only, thereby leaving the other hand free for other uses. The knurled edges of the spool enable it to be rewound, as before described, and the friction of the spool is such as to hold it in any position that it may be placed for use, and unwound only by design.

I claim as my invention—

The plumb A, in combination with the frame B and friction-spool C, arranged with its edges projecting from the frame, substantially as and for the purposes described.

JUSTUS A. TRAUT.

Witnesses:
JAMES SHEPARD,
FRED. N. STANLEY.